Sept. 12, 1939.  W. SIEGERT  2,172,855

HIGH PRESSURE VALVE

Filed Jan. 18, 1937  2 Sheets-Sheet 1

Inventor:
Walter Siegert.
By Bunning & Bunning
Attorneys.

Sept. 12, 1939. W. SIEGERT 2,172,855
HIGH PRESSURE VALVE
Filed Jan. 18, 1937 2 Sheets-Sheet 2
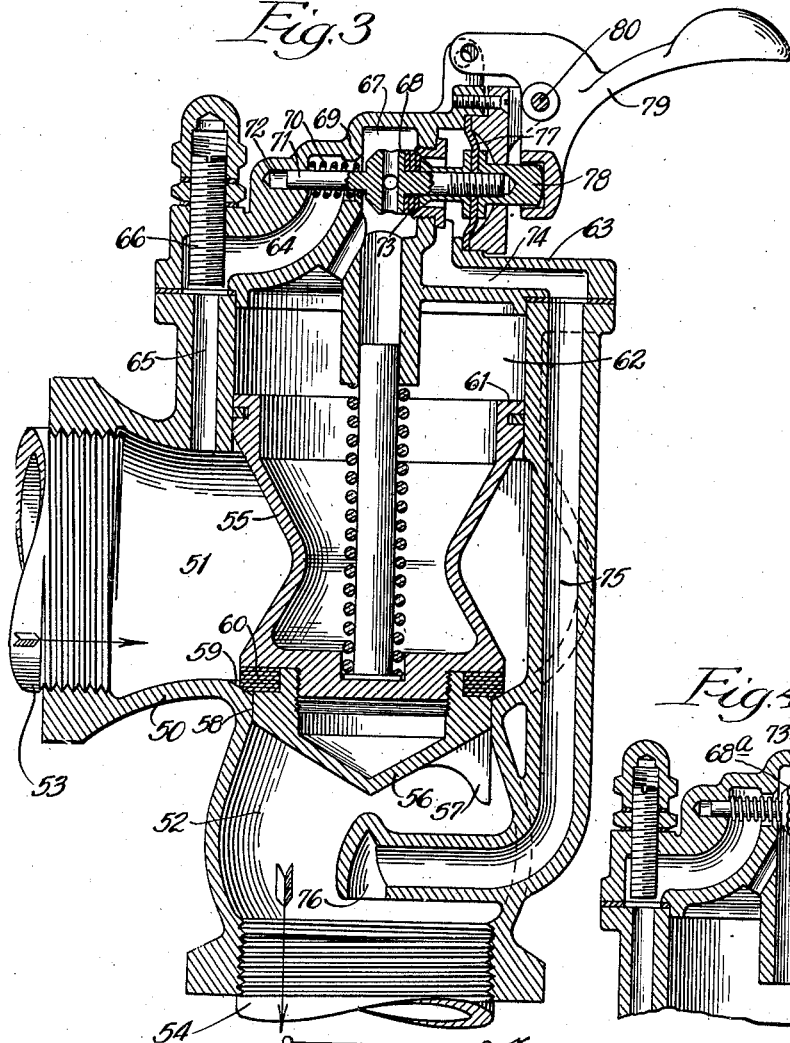
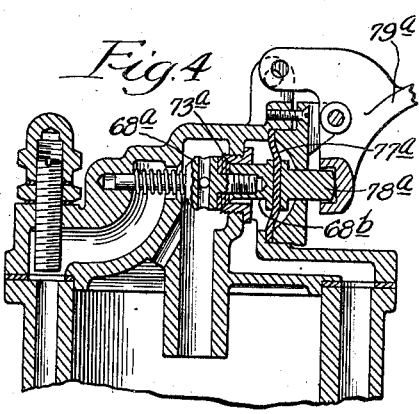
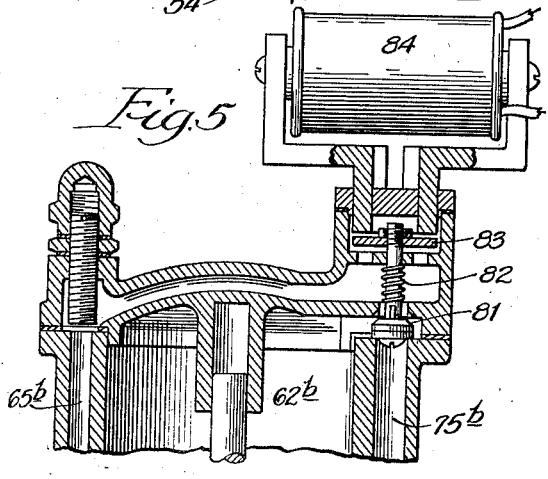
Inventor.
Walter Siegert,
By Attorneys.

Patented Sept. 12, 1939

2,172,855

UNITED STATES PATENT OFFICE 2,172,855

HIGH PRESSURE VALVE

Walter Siegert, Chicago, Ill.

Application January 18, 1937, Serial No. 121,120

4 Claims. (Cl. 137—139)

This invention relates to an over-balanced plunger or piston type of valve such as is adapted for use with a high pressure line containing various liquids—oil or gasoline, for example.

An object of this invention is to provide a valve which will open with a minimum of effort when the valve is operating under very high pressure.

Another object is to provide a valve which has adjustable means for slowly closing the valve under high pressure with resultant elimination of hydraulic hammer in the pipe line.

Still another object is to provide a valve of this type having a means for controlling the opening and closing of the valve which operates through an element which is so constructed and applied to the valve as to eliminate stuffing boxes with their resultant leaks and other troubles.

These and other objects which will hereinafter appear are fully described in the following specification and shown in the accompanying drawings, in which,—

Fig. 3 is a longitudinal section of an angle valve embodying a modified form of the invention;

Fig. 4 is a partial view of the upper portion of the valve of Fig. 3 showing a modified form of pilot valve and diaphragm; and Fig. 5 is a view similar to Fig. 4, but modified to the extent of showing an electro-magnetic means for operating the valve.

Figure 1:
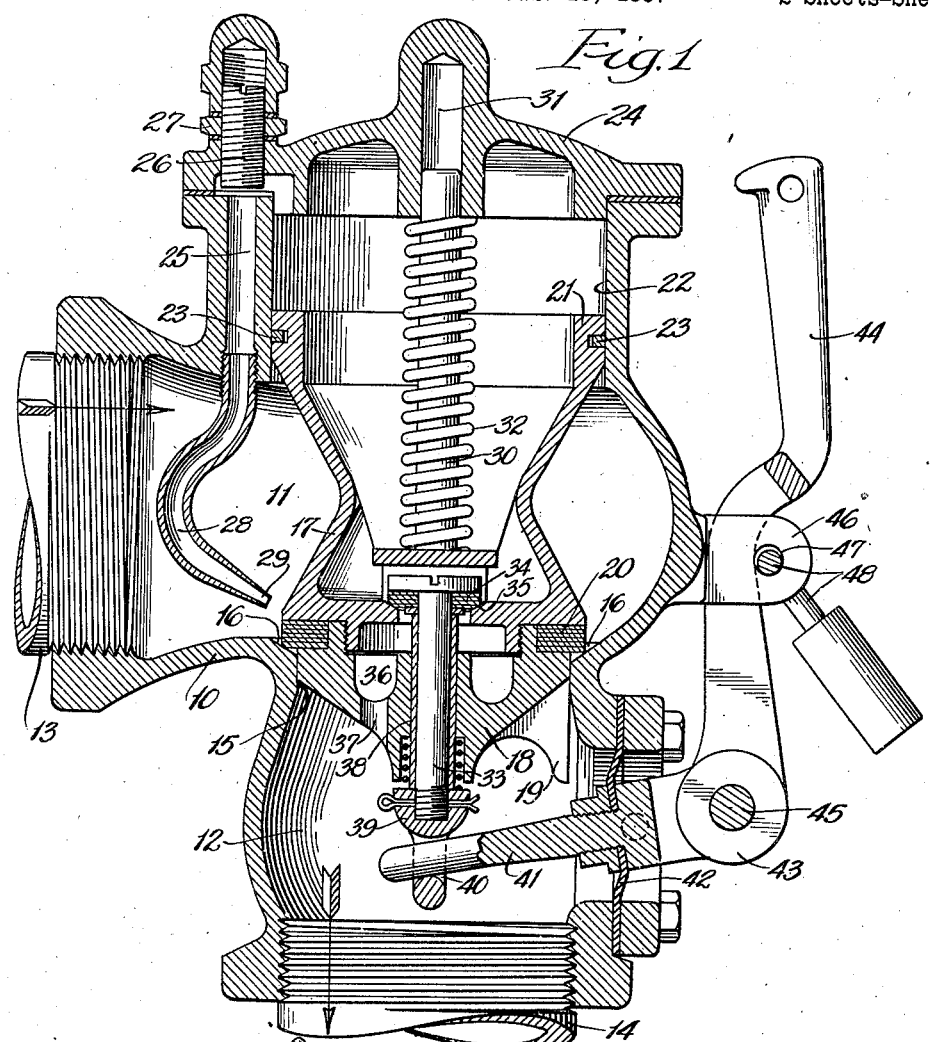
Figure 1 is a longitudinal section through a valve of the angle type embodying one form of the invention.

The embodiment shown in Fig. 1 comprises a valve housing 10 which has inlet and outlet chambers 11 and 12, respectively, the openings of which are appropriately formed for connection with inlet and outlet pipes 13 and 14. Between these chambers is a circular passage 15 having at its upper end a conical valve seat 16.

A main valve body 17 has a valve guide 18 screwed thereto with wings 19, preferably three in number, passing through the passage so as to serve as a guide for the lower portion of the valve body. Between the valve body 17 and the valve guide 18 is placed a pliable disk 20 which is made of any suitable metal, alloy or composition, and which serves as a valve when pressed against the seat 16. The upper end of the body 17 consists of a hollow piston 21 slidably fitted into a cylinder 22 which is in axial alignment with the passage 15. One or more piston rings 23, set in suitable recesses in the piston, serve to provide a substantially leak-proof connection between the piston and the cylinder.

A cylinder head 24 is fitted into the upper end of the cylinder and secured thereto in any well known manner, as by means of cap screws, not shown. A passage 25 connects the upper portion of the cylinder with the inlet valve chamber 11, and this passage is controlled by means of an adjusting screw 26 which may be set and locked at any adjusted position by means of a nut 27. The lower end of the passage 25 connects to a tube 28 which has a bent end 29 which faces in the direction of the fluid flow through the valve when the latter is open. The effect of this positioning of this bent tube when the valve 17 is raised from its seat 16 is to produce a certain amount of vacuum in the passage 28, the purpose of which will later be explained.

A stem 30 extends axially from the valve body, the upper end being guided in a central opening 31, and a spring 32 surrounding this stem presses the valve toward its seat. A pilot valve member 33 is slidably mounted in the valve guide 18 preferably axially thereof, and carries a pilot valve 34 which bears upon a conical valve seat 35. When this valve is raised it opens communication between the hollow interior of the valve body 17 and an annular passage 36, which in turn communicates through an opening 37 with the outlet chamber 12. A sleeve 38 surrounds the stem of the valve member 33, and a nut 39 threaded on the lower end of this valve stem serves to hold the valve 34 on the valve member, the valve member 34 preferably being made up of an annular disk of pliable material in much the same way as the disk 20.

The nut 39 is provided with an opening 40 through which passes an operating finger 41, the opposite end of which passes through a flexible diaphragm 42 and is connected to a member 43 which is operably connected to an operating lever 44 by means of a locking bolt 45 which holds the lever in any adjusted position.

With the parts in the position shown in Fig. 1, both the main and the pilot valves are closed and the operating lever 44 is in an inoperative position. This lever has a hole through which passes an ear 46 having a hole 47 through which the bolt of a padlock 48 or the like may be passed so that the lever may be locked to prevent the valve from being opened except by authorized persons.

The operation of the device is as follows: The piston 21 being of larger diameter than the valve 20, when pressures on the two sides of the main valve are rendered equal by opening the valve 34, the pressure of the pipe line acting upon the unbalanced valve will tend to cause it to rise against the action of the spring 32. With both the valves 20 and 34 closed, however, pressure from the pipe line will pass through the pipe 28 and the passage 25, and this pressure, acting upon the entire cross sectional area of the piston as well as the valve 34, will tend to hold both valves firmly closed.

In order to open the valve (which may be connected in with a pipe line 13 at high pressure while the delivery line 14 is at or near atmospheric pressure), the operator removes the padlock 48 and pulls out on the lever 44, thereby lifting the pilot valve 34, thus placing the pressure within the chamber 22 at or near atmospheric pressure. The high pressure within the inlet chamber 11 raises the main valve body because of the unbalanced pressure, due to the fact that the piston 21 is larger than the valve 20. The instant the valve 20 is lifted, the rush of liquid or fluid past the tube 28 and the openings 37 which operate upon the principle of Venturi tubes, tend to lower the pressure within the chamber 22 below that in the chamber 12 and serves as an additional means of holding the piston body 17 and the valve 20 in a raised position so long as the pilot valve 34 is held open by the lever 44.

When it is desired to close the main valve, the operator moves the lever 44 toward closed position, thereby closing the pilot valve 34. As the main valve approaches its seat 16 pressure within the chamber 11 will again build up within the pipe 28, and fluid from the intake chamber will pass up through the pipe 28 and the passage 25 to the cylinder 22, forcing the valve against its seat 16 assisted by the spring 32. The speed at which this valve may be closed is controlled to a large degree by the size of the orifice beneath the adjusting screw 26. This valve closes very slowly even under heavy pressure in the inlet pipe 13 owing to the fact that liquid to permit this closing must pass through the passage 25 and the orifice beneath the adjusting screw 26, the speed of closing thus being made adjustable.

Figure 2:
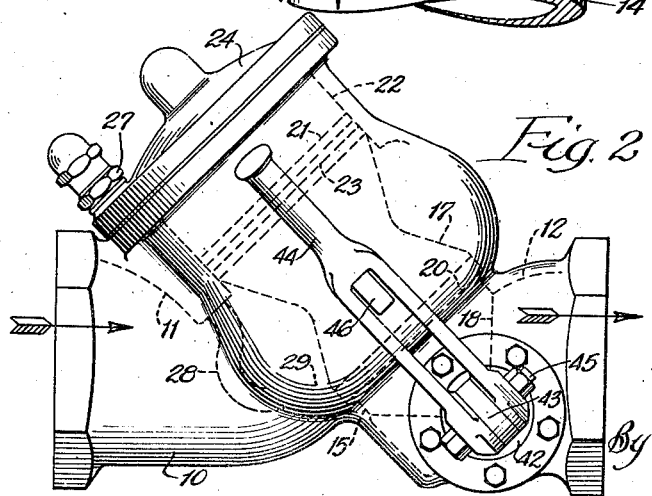
Fig. 2 is a side elevation showing the invention applied to a straightaway valve, the principal operating parts of the valve being shown in dotted lines.

In Fig. 2 the construction is substantially the same as that of Fig. 1, except that the axis of the valve instead of being at right angles to the inlet pipe 13 is set at substantially 45° thereto, and the output pipe 12 is placed substantially in alignment with the inlet pipe. In Fig. 3 the valve housing 50 is provided with inlet and outlet chambers 51, 52, and these, as before, are suitably formed for connection with inlet and outlet pipes 53, 54. A preferably hollow valve body 55 is provided, as before, with a valve guide 56 having wings 57 which are slidably fitted in a passage 58 having in its upper portion a conical valve seat 59. A valve 60 comprising, by preference, a pliable disk is held between the main valve body and the guide 56 so as to provide a suitable valve for the valve seat 59. The upper portion of the main valve body is larger than the valve 60 and forms a piston 61 which is operable in the cylinder 62.

In this case, however, the pilot valve for controlling the main valve instead of being mounted in the latter is mounted above it in the cylinder head 63. This cylinder head has a passage 64 communicating at one end with the passage 65 which leads to the inlet valve chamber 51, the latter passage being controlled by means of an adjusting screw 66 in the same way as that shown in Fig. 1. The other end of the passage 64 communicates with a chamber 67 which houses a double-acting pilot valve 68. A valve seat 69 lying in the path of the valve 68 may be closed when the pilot valve is moved to the left against the action of a spring 70, the valve being guided at the left hand side by means of a stem 71 in an axial hole 72.

The other side of the pilot valve 68, as shown in Fig. 3, closes a valve seat 73 which leads to a passage 74, the latter communicating through a long passage 75 with an outlet 76 which lies in the path of the liquid or fluid passing the main valve when the latter is open. This opening 76 faces in the same direction as the flow of liquid, with the result that it tends to produce a vacuum in the passage 74 since it also acts on the principle of a Venturi tube. It will be noted that the stem of the pilot valve 68 passes through a flexible diaphragm 77 which prevents leakage to the outside of the valve. An extension 78 supports and guides the right hand end of this valve and is adapted to be engaged by an operating lever 79 which is pivotally mounted on a pin 80.

The operation of the valve is as follows:

With the valve closed as shown in Fig. 3, and with the inlet pipe 53 under high pressure while the outlet pipe 54 is at or near atmospheric pressure, the valve will be held closed by the pressure of the line acting thereon. In order to open this valve the operator presses down on the operating lever 79; the pilot valve 68 is thereupon moved to the left from the position shown, in which it closes the seat 73, so that it leaves the seat 73 and covers the seat 69. Thus the cylinder 62 is placed at atmospheric pressure through the passage 74, and at the same time pressure from the pipe line 53 is prevented from entering the chamber 68 because the seat 69 is covered by the pilot valve. Pressure within the chamber 51 will therefore unbalance the main valve body 55, causing it to rise as previously described, the valve seat 59 being uncovered in consequence so as to permit liquid or fluid within the pipe 53 to pass to the pipe 54. At the same time the passages 74, 75 will be placed below pressure in the chamber 52 so that the vacuum produced within the cylinder 62 will also tend to maintain the main valve in open position. This it will do so long as the pilot valve is held open.

To close the valve the operator releases the operating lever 79 with the result that the pilot valve is forced by the pressure within the passage 64 and by the spring 70 back to the position shown in Fig. 3. As the seat 73 is covered, pressure from the pipe line passes through the passages 65, 64 to the cylinder 62, thereby forcing the valve down to its seat as shown in Fig. 3. This can be rendered very gradual, however, by a proper adjustment of the screw 66.

Fig. 4 shows a modified form of the construction illustrated in Fig. 3. The pilot valve 68ª, as here shown, has no extension passing through the diaphragm 77ª. On the contrary, the valve is provided with a series of guides 68ᵇ which are in the form of spaced wings, preferably three in number, which are slidable in the valve seat 73ª. In this form the flexible diaphragm 77ª is imperforate and has a plunger 78ª which makes contact with and is operated by an operating lever 79ª as in Fig. 3; otherwise the construction of Fig. 4 is the same as that of Fig. 3.

In Fig. 5 is shown still another modification of the construction in which a double-acting pilot valve 81, held down by a spring 82, closes a passage 75ᵇ and opens a passage 65ᵇ between the cylinder 62ᵇ and the inlet chamber which is at high pressure, thereby firmly holding the main valve on its seat. This pilot valve has at its upper end an armature 83 which lies beneath the poles of an electromagnet 84 which is energized at the will of the attendant, or by means of an automatic switch, operable by a suitable source of current (not shown). On raising the valve 81, the action is the same as that described for the valve 68. The cylinder 62ᵇ, under high pressure from the passage 65ᵇ, is reduced to atmospheric pressure due to closing the passage 65ᵇ and opening communication with the passage 75ᵇ, both by the movement of the pilot valve 81. So long as the magnet is energized, the main valve is opened, and held open, but is closed by the spring 82 as soon as the magnet is de-energized and the valve 81 released. The main valve is then slowly closed as before.

I claim:

1. In a valve of the class described, a valve housing, a partition therein dividing the valve body into inlet and outlet chambers, said partition having a circular opening whose edge serves as a valve seat, a cylinder in alignment with the seat and lying on the side of the inlet chamber opposite the valve seat and spaced longitudinally therefrom, a valve body having a piston slidable in the cylinder, the valve body carrying a main valve for closing the valve seat, the cylinder being larger than the valve seat, manually operable means for closing and effecting opening of the main valve including a pilot valve for controlling communication between the cylinder and outlet chamber, and means operable by the flow of fluid from the inlet to the outlet through the valve tending to lower the pressure in the cylinder below that in the inlet chamber adjacent the main valve to assist in maintaining the main valve in open position, said last mentioned means operating after closing of said main valve to build up a pressure in said cylinder substantially equal to that in said inlet.

2. In a valve of the class described, a valve housing, a partition therein dividing the valve body into inlet and outlet chambers, said partition having a circular opening whose edge serves as a valve seat, a cylinder in alignment with the seat and lying on the side of the inlet chamber opposite the valve seat and spaced longitudinally therefrom, a valve body having a piston slidable in the cylinder, the valve body carrying a main valve for closing the valve seat, the cylinder being larger than the valve seat, means including a manually controlled pilot valve for controlling communication between the inlet and outlet chambers to control the opening and closing of the main valve, and a passageway communicating with said inlet and cylinder including a tube having at one end an opening facing in the direction of flow of fluid passing through the main valve and communicating at the other with the cylinder tending to lower the pressure in the cylinder below that in the inlet chamber adjacent the main valve to assist in maintaining the main valve in open position and to resist closing thereof.

3. In a valve of the class described, a valve housing, a partition therein dividing the valve body into inlet and outlet chambers, said partition having a circular opening whose edge serves as a valve seat, a cylinder in alignment with the seat and lying on the side of the inlet chamber opposite the valve seat and spaced longitudinally therefrom, a valve body having a piston slidable in the cylinder, the valve body carrying a main valve for closing the valve seat, the cylinder being larger than the valve seat, a passageway providing for communication between said inlet and cylinder, manually operable means for closing and effecting opening of the main valve including a pilot valve for controlling communication between the cylinder and outlet chamber, and means providing a fluid inlet for said passageway during closing of said main valve, said means being operable by the flow of fluid through the valve from the inlet to the outlet tending to lower the pressure in the passageway and cylinder below that in the inlet chamber adjacent the main valve to assist in maintaining the main valve in open position, the pilot valve being located in the valve body.

4. In a valve of the class described, a valve housing, a partition therein dividing the valve body into inlet and outlet chambers, said partition having a circular opening whose edge serves as a valve seat, a cylinder in alignment with the seat and lying on the side of the inlet chamber opposite the valve seat and spaced longitudinally therefrom, a hollow valve body having a piston extension portion slidable in the cylinder, the valve body being tubular with its central portion circumferentially contracted and carrying a main valve at its lower end for closing the valve seat, the cylinder being larger than the valve seat, a passageway providing a communication between the inlet and cylinder, said passageway having an inlet operable after the closing of the main valve to build up pressure in said cylinder and after opening of the main valve to cause lowering of pressure in said cylinder below that in said outlet, a pilot valve for controlling communication between the cylinder and outlet chamber to control the opening of the main valve, and a lever for operating the pilot valve and main valve hingedly mounted on the valve housing and extending through a flexible diaphragm closing an opening in the side of the housing.

WALTER SIEGERT.